(12) United States Patent
Evans et al.

(10) Patent No.: US 8,970,348 B1
(45) Date of Patent: Mar. 3, 2015

(54) USING SEQUENCES OF FACIAL GESTURES TO AUTHENTICATE USERS

(75) Inventors: Jason M. Evans, Mountain View, CA (US); Sean P. Loosli, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 227 days.

(21) Appl. No.: 13/596,910

(22) Filed: Aug. 28, 2012

(51) Int. Cl.
*G06K 9/00* (2006.01)
(52) U.S. Cl.
USPC ........ 340/5.83; 340/5.52; 340/5.53; 340/5.81
(58) Field of Classification Search
USPC ............... 340/5.52, 5.3, 5.81, 5.82, 5.83, 5.5, 340/5.833
See application file for complete search history.

(56) References Cited

U.S. PATENT DOCUMENTS

| | | | |
|---|---|---|---|
| 2002/0010684 A1* | 1/2002 | Moskowitz | 705/75 |
| 2005/0229007 A1* | 10/2005 | Bolle et al. | 713/186 |
| 2012/0249297 A1* | 10/2012 | Du et al. | 340/5.82 |
| 2013/0227651 A1* | 8/2013 | Schultz et al. | 726/4 |

* cited by examiner

*Primary Examiner* — Andrew Bee
(74) *Attorney, Agent, or Firm* — Park, Vaughan, Fleming & Dowler LLP; Chia-Hsin Suen (57) ABSTRACT

The disclosed embodiments provide a system that authenticates a user. During operation, the system obtains a sequence of facial gestures from the user. Next, the system authenticates the user based on a likeness of the sequence to a set of baseline representations of the facial gestures.

26 Claims, 5 Drawing Sheets

USING SEQUENCES OF FACIAL GESTURES TO AUTHENTICATE USERS

BACKGROUND

Related Art

The disclosed embodiments relate to user authentication. More specifically, the disclosed embodiments relate to techniques for authenticating users using sequences of facial gestures from the users.

Authentication techniques are commonly used to verify user identities. After a user is successfully authenticated, the user may be granted access to data, features, services, and/or other resources associated with the user's identity and/or user account. For example, a user may be required to provide authentication credentials before withdrawing cash from an automated teller machine (ATM), accessing an online banking system, entering a building, sending and receiving emails, and/or running one or more applications on a local or remote electronic device.

Authentication is typically performed through interaction between the user and an authenticating system. In particular, the authenticating system may ascertain the user's identity by requesting one or more authentication factors from the user. These authentication factors may include information that identifies the user, such as a login name or biometric signature. They may also include items possessed by the user, such as an identification card, security token, software token, and/or mobile phone. Finally, the authentication factors may include confidential information that is known by the user, such as a password, passphrase, and/or personal identification number (PIN). A user is typically authenticated if the combination of authentication factors provided by the user matches records pertaining to the user's identity. For example, the user may be authenticated by an online banking system after correctly providing a login, password, and an answer to a security question to the online banking system.

Moreover, the widespread adoption and use of electronic devices and/or communications to access, store, and transmit sensitive data has prompted a need for more secure and/or robust authentication of users associated with the data. For example, a user's smartphone may allow the user to access his/her email accounts, Short Message Service (SMS) correspondence, social networks, address book, photos, videos, documents, and/or other sensitive and/or personal information. The loss and/or theft of the smartphone may thus allow another user to access, misuse, and/or exploit the information unless the smartphone includes mechanisms to authenticate the user before access to the information is granted. Consequently, protection of information from unauthorized access, use, disclosure, destruction, and/or tampering may require the ongoing development of mechanisms for accurately authenticating users prior to granting the users access to the information.

SUMMARY

The disclosed embodiments provide a system that authenticates a user. During operation, the system obtains a sequence of facial gestures from the user. Next, the system authenticates the user based on a likeness of the sequence to a set of baseline representations of the facial gestures.

In some embodiments, the system also verifies the user as a source of the facial gestures prior to authenticating the user.

In some embodiments, the user is verified as the source of the facial gestures based on a smoothness of transitions between the facial gestures in the sequence.

In some embodiments, obtaining the sequence of facial gestures from the user involves at least one of prompting the user to provide each facial gesture from the sequence of facial gestures, and obtaining the sequence of facial gestures from the user without specifying the facial gestures in the sequence to the user.

In some embodiments, authenticating the user based on the likeness of the sequence to the set of baseline representations involves:
 (i) determining the likeness by comparing each facial gesture from the sequence of facial gestures to a corresponding baseline representation of the facial gesture from the set of baseline representations; and
 (ii) if the likeness exceeds a pre-specified threshold, verifying an identity of the user.

In some embodiments, if the likeness falls below the pre-specified threshold, authenticating the user based on the likeness of the sequence to the set of baseline representations further involves attempting to verify the identity of the user using one or more new sequences of facial gestures until a limit to the number of authentication attempts for authenticating the user using the facial gestures is reached.

In some embodiments, the identity is associated with a user account of the user.

In some embodiments, the sequence of facial gestures includes at least one of a blank expression, a smile, a frown, a wink, a blink, a grimace, a custom facial gesture, and a facial movement.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
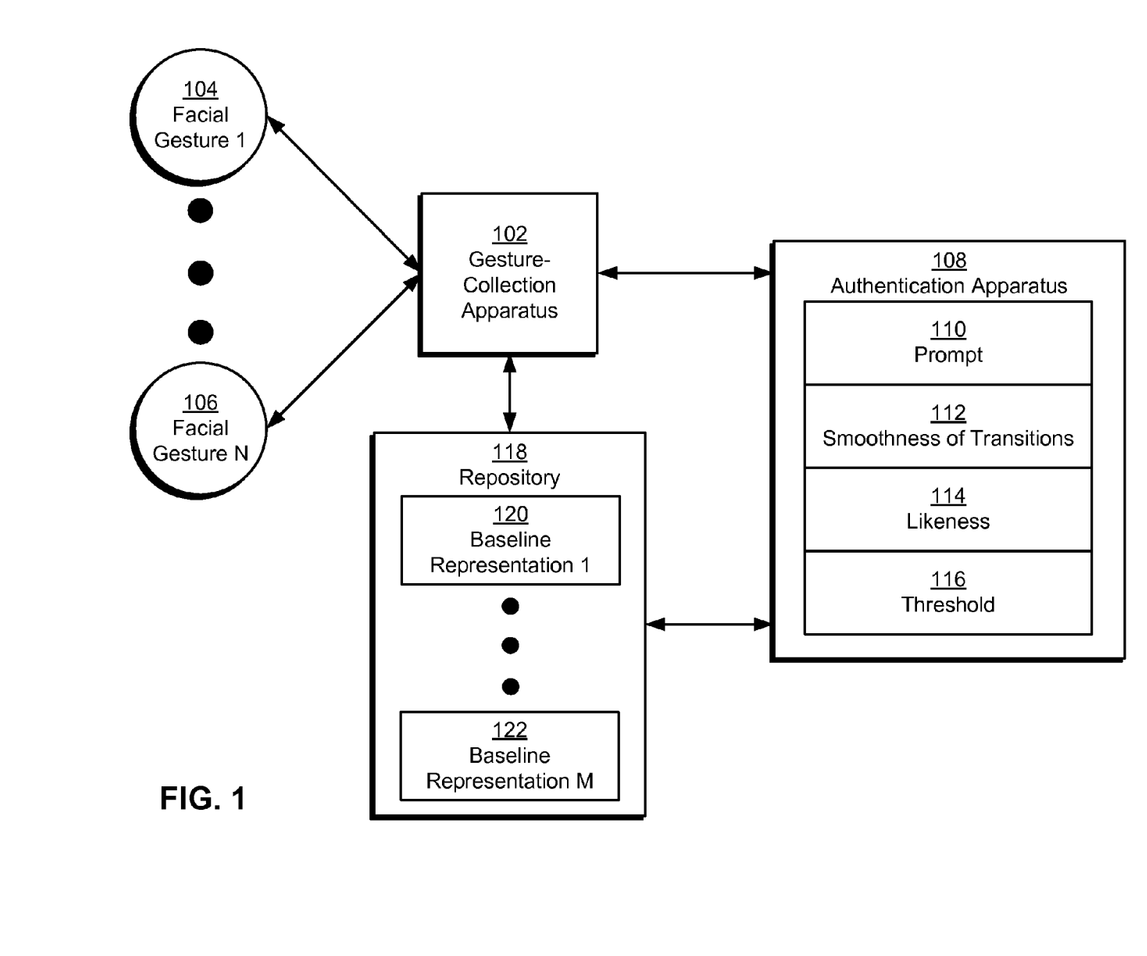
FIG. 1 shows a schematic of a system in accordance with the disclosed embodiments.

The disclosed embodiments provide a method and system for authenticating a user. As shown in FIG. 1, the system includes a gesture-collection apparatus 102 and an authentication apparatus 108. Gesture-collection apparatus 102 and authentication apparatus 108 may enable the authentication of a user using a sequence of facial gestures (e.g., facial gesture 1 104, facial gesture n 106) from the user, such as blank expressions, smiles, frowns, winks, blinks, grimaces, custom facial gestures, and/or facial movements (e.g., nods, head shakes, head tilts, etc.).

In particular, gesture-collection apparatus 102 and authentication apparatus 108 may use multiple facial gestures to establish the user's identity prior to granting the user access to services, features, and/or resources associated with the user's identity. For example, the system of FIG. 1 may require authentication of the user before enabling access to a physical location (e.g., a building, a vault, etc.), a user account (e.g., email account, online banking system, social network, etc.), and/or an electronic device (e.g., mobile phone, personal computer, laptop computer, tablet computer, portable media player, etc.). To facilitate accurate and/or secure authentication of the user, the facial gestures may be accompanied by one or more other identifiers and/or authentication factors for the user and/or user account, such as a username, full name, fingerprint, voice, and/or badge. On the other hand, authentication of the user may be streamlined by requiring only the sequence of facial gestures from the user.

Gesture-collection apparatus 102 may include a camera and/or other electronic device for obtaining the facial gestures from the user. For example, gesture-collection apparatus 102 may be located on the electronic device to which access is granted after the user is authenticated. Alternatively, gesture-collection apparatus 102 may be a standalone camera (e.g., webcam, security camera, video camera, etc.) and/or other device that collects the facial gestures from the user to enable access to data, services, and/or resources that reside separately from gesture-collection apparatus 102.

Facial gestures captured by gesture-collection apparatus 102 may then be transmitted to authentication apparatus 108 for processing and/or analysis. For example, gesture-collection apparatus 102 may write video frames containing the facial gestures to memory on an electronic device and provide the memory locations of the video frames to authentication apparatus 108 executing on a processor of the electronic device. Conversely, gesture-collection apparatus 102 may transmit the video frames over a network connection with authentication apparatus 108 executing on a remote server and/or cloud computing system.

Authentication apparatus 108 may manage the collection of facial gestures by gesture-collection apparatus 102, as well as the authentication of the user using the facial gestures. First, authentication apparatus 108 may provide a prompt 110 for each facial gesture from the sequence of facial gestures. For example, authentication apparatus 108 may select a sequence of three random facial gestures to be provided by the user. Authentication apparatus 108 may then provide the selected facial gestures to the user (e.g., through a display and/or user interface associated with gesture-collection apparatus 102) by displaying the facial gestures within a list, or by waiting for the user to provide each facial gesture in the sequence before requesting the next facial gesture in the sequence.

Conversely, authentication apparatus 108 may omit prompt 110 during authentication of the user. For example, the sequence of facial gestures used to verify the user's identity may be selected by the user prior to authentication of the user (e.g., during the creation of a user account for the user). The sequence may also be known only to the user, thus increasing the level of security associated with authenticating the user. The user may then verify his/her identity by providing the entire sequence to gesture-collection apparatus 102 and/or authentication apparatus 108 without any prompting, or with prompting that does not reveal the names and/or types of facial gestures in the sequence (e.g., "facial gesture 1," "facial gesture 2," "facial gesture 3").

Next, authentication apparatus 108 may verify the user as the source of the facial gestures by examining a smoothness of transitions 112 between gestures in the sequence. For example, authentication apparatus 108 may require that the user's face be in each video frame captured by gesture-collection apparatus 102, and that facial features transition smoothly from one video frame to the next. Moreover, authentication apparatus 108 may reject the sequence if the facial features include "jumpy" transitions, thus preventing an unauthorized user from attempting to fake the user's identity by presenting a series of still images of the user's facial gestures to gesture-collection apparatus 102.

Once the user is verified as the source of the facial gestures, authentication apparatus 108 may authenticate the user based on a likeness 114 of the sequence to a set of baseline representations (e.g., baseline representation 1 120, baseline representation m 122) of the facial gestures. In one or more embodiments, baseline representations of the facial gestures are obtained from the user and stored in a repository 118 before the user is authenticated using the facial gestures. For example, the baseline representations may be obtained by gesture-collection apparatus 102 and/or a different gesture-collection apparatus (e.g., a camera) during initial setup of a user account for the user (e.g., with a security system, online banking system, social network, electronic device, etc.). The baseline representations may then be stored in a file and/or relational database corresponding to repository 118 by the gesture-collection apparatus and/or authentication apparatus 108 for subsequent use in authenticating the user.

Like gesture-collection apparatus 102 and/or authentication apparatus 108, repository 118 may be locally and/or remotely accessible to other components of the system of FIG. 1. For example, repository 118 may be located on the user's electronic device along with gesture-collection apparatus 102 and/or authentication apparatus 108, or repository 118 may be located on a network connected to one or more electronic devices and/or network nodes providing gesture-collection apparatus 102 and/or authentication apparatus 108.

To obtain the baseline representations, authentication apparatus 108 may prompt the user for the baseline representations or obtain a selection of each baseline representation from the user prior to obtaining the baseline representation from the user. For example, authentication apparatus 108 may require that the user provide baseline representations of a blank facial expression, a smile, a frown, a wink, a blink, a grimace, and/or a facial movement (e.g., nod, headshake, head tilt, etc.). Conversely, the user may select a subset of possible facial gestures to provide as baseline representations to authentication apparatus 108, including custom facial gestures (e.g., "puff cheeks," "scrunch nose," "fish face," "cross-eyed," "clown face," etc.).

Moreover, authentication apparatus 108 may "calibrate" each baseline representation by prompting the user to perform the corresponding facial gesture multiple times to account for natural variations in the performance of a repeatable task (e.g., providing a facial gesture). Each "instance" of the facial gesture provided by the user may then be stored in repository 118 for subsequent authentication of the user, as discussed in further detail below.

As described above, the user may also specify the sequence of facial gestures to be used in subsequent verification of the user's identity instead of receiving a random sequence of facial gestures from authentication apparatus 108 during every authentication attempt. If the sequence is not specified by the user, authentication apparatus 108 may randomly generate the sequence from available baseline representations of the user's facial gestures in repository 118 every time the user authenticates using facial gestures.

In one or more embodiments, authentication apparatus 108 determines likeness 114 by comparing each facial gesture from the sequence of facial gestures to a corresponding baseline representation of the facial gesture from the baseline representations in repository 118. For example, each baseline representation may include a set of attributes associated with the corresponding facial gesture (e.g., shape of mouth, shape of eyes, location of pupils, dimensions of nose, spacing of facial features, etc.). Likeness 114 may thus be calculated by obtaining the same attributes from each facial gesture in the sequence and determining the level of similarity between the attributes from the facial gesture and the attributes from the corresponding baseline representation. If multiple instances and/or versions of the baseline representation are available (e.g., as provided by the user during collection of the baseline representations), likeness 114 may be calculated as the level of similarity between the facial gesture and one or more relevant instances and/or versions. For example, if three versions of the baseline representation are found in repository 118, a numeric value of similarity between the facial gesture and each baseline representation may be calculated, and the numeric value that indicates the highest level of similarity between the facial gesture and the corresponding baseline representation may be used as likeness 114. Alternatively, likeness 114 may be calculated as the average of the three numeric values.

Authentication apparatus 108 may then compare likeness 114 to a pre-specified threshold 116 to authenticate the user. If likeness 114 exceeds threshold 116, authentication apparatus 108 may verify the identity of the user. In turn, the verified identity may allow the user to access information, services, and/or resources associated with a user account tied to the user's identity. If likeness 114 does not exceed threshold 116, authentication apparatus 108 may attempt to verify the identity of the user using one or more new sequences of facial gestures from gesture-collection apparatus 102 until a limit to the number of authentication attempts for authenticating the user using the facial gestures is reached. For example, authentication apparatus 108 may grant the user three attempts to authenticate using sequences of facial gestures. If the user does not succeed at authenticating after the third attempt, authentication apparatus 108 may prevent further authentication attempts by the user for a pre-specified period (e.g., five minutes, one hour, one day, etc.) and/or until the user confirms his/her identity using another authentication mechanism.

In addition, likeness 114 may be determined and compared to threshold 116 for each individual facial gesture in the sequence or for the sequence of facial gestures as a whole. For example, likeness 114 may be determined and compared to threshold 116 for the first facial gesture in the sequence. If likeness 114 exceeds threshold 116, the user may be prompted to provide the second facial gesture in the sequence, and likeness 114 may be recalculated for the second facial gesture and compared to threshold 116. Recalculation of likeness 114 for each facial gesture in the sequence may thus continue until likeness 114 exceeds threshold 116 for all facial gestures in the sequence or the user runs out of authentication attempts. On the other hand, likeness 114 may be calculated as an average of all values of likeness between the facial gestures in the sequence and the baseline representations of the facial gestures in repository 118. If the average value of likeness 114 exceeds threshold 116, the user's identity may be verified. If the average value of likeness falls below threshold 116, the user may be asked to perform the entire sequence of facial gestures in a subsequent authentication attempt with gesture-collection apparatus 102 and/or authentication apparatus 108.

Such use of facial gestures in authenticating the user may allow the user to verify his/her identity without requiring the user to keep track of passwords, personal identification numbers (PINs), physical and/or software tokens, and/or other external authentication factors. The same facial gestures may also be hard to spoof, thus protecting the data, services, and/or resources associated with the user's identity and/or user account from access by unauthorized users. Consequently, the system of FIG. 1 may provide a "bio-behavioral" authentication mechanism that is both more secure than common authentication mechanisms (e.g., username/password, access code, individual biometric signatures, etc.) and easier to use than other secure authentication mechanisms (e.g., security tokens, certificates, etc.).

Figure 2:
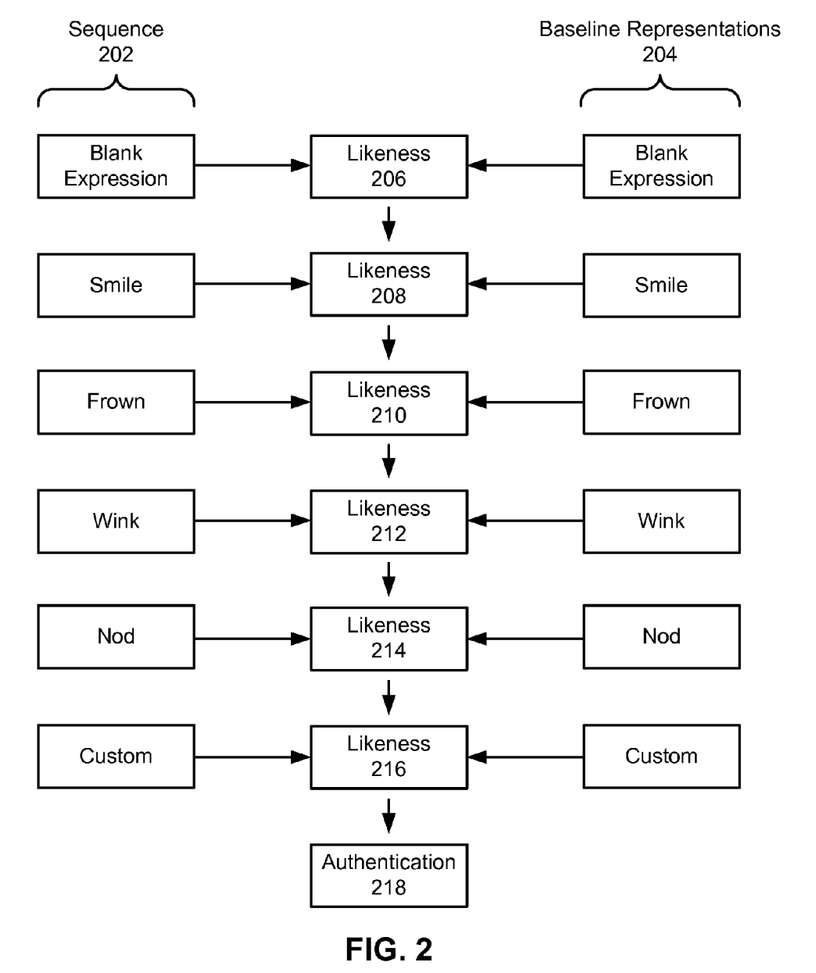
FIG. 2 shows an exemplary authentication of a user in accordance with the disclosed embodiments.

FIG. 2 shows an exemplary authentication 218 of a user in accordance with the disclosed embodiments. As mentioned above, the user may be authenticated by obtaining a sequence 202 of facial gestures from the user. For example, each facial gesture in sequence 202 (e.g., blank expression, smile, frown, wink, nod, custom) may be randomly selected, and the user may be prompted to provide the facial gesture (e.g., to a camera). Conversely, sequence 202 may correspond to a pre-determined sequence of facial gestures, analogous to a "password," that is provided by the user during authentication 218 without requiring the names and/or types of the facial gestures to be specified to the user. A series of likenesses 206-216 between the facial gestures in sequence 202 and baseline representations 204 may then be calculated and used in authentication 218 of the user.

As shown in FIG. 2, sequence 202 may begin with a blank expression from the user, which is compared to a corresponding blank expression from baseline representations 204 to obtain likeness 206. Next, sequence 202 may proceed to a smile from the user, which is compared to a smile from baseline representations 204 to obtain likeness 208. Likeness 210 may then be determined after a frown from sequence 202 is compared to a frown from baseline representations 204, and likeness 212 may be calculated by comparing a wink from sequence 202 to a corresponding wink from baseline representations 204. Finally, likeness 214 between a nod from sequence 202 and a nod from baseline representations 204 may be calculated, as well as likeness 216 between a custom facial gesture from sequence 202 and a corresponding custom facial gesture from baseline representations 204.

Authentication 218 of the user may succeed if likenesses 206-216 exceed a pre-specified threshold. For example, the user's identity may be verified only after each likeness 206-216 exceeds the threshold. On the other hand, an "average" likeness may be calculated from likenesses 206-216 and compared to the threshold to determine if the user's identity is verified or not using sequence 202. Finally, authentication 218 may fail if sequence 202 and/or one or more new sequences of facial gestures from the user reach a limit to the number of authentication attempts allowed for the user. For example, an authentication attempt may be used every time one or more likenesses 206-216 fall below the threshold. Moreover, the user may be "locked out" of subsequent authentication attempts for a number of minutes, hours, and/or days after the limit is reached to mitigate risk associated with attempts to spoof the user's identity by unauthorized users.

Figure 3:
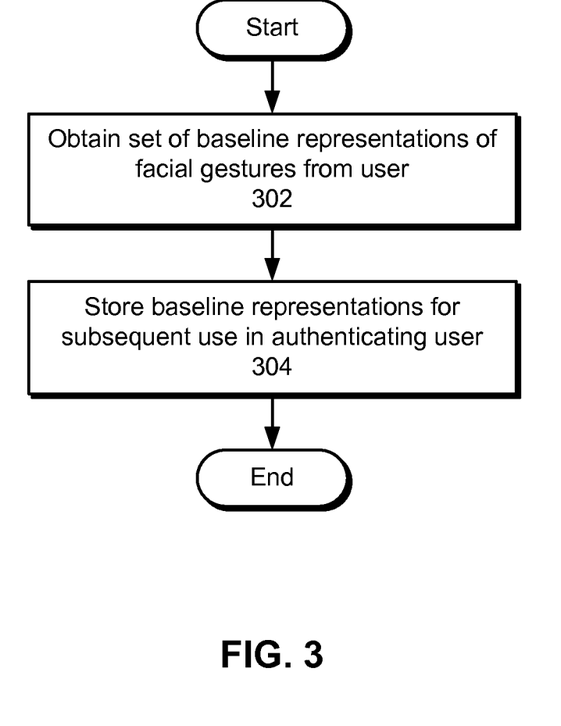
FIG. 3 shows a flowchart illustrating the process of facilitating authentication of a user in accordance with the disclosed embodiments.

FIG. 3 shows a flowchart illustrating the process of facilitating authentication of a user in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

First, a set of baseline representations of facial gestures is obtained from the user (operation 302). The baseline representations may be obtained by prompting the user to provide each facial gesture from the set of baseline representations, or by obtaining a selection of each facial gesture from the user prior to obtaining the facial gesture from the user. In other words, specific baseline representations may be requested from the user and/or selected by the user.

Next, the baseline representations are stored for subsequent use in authenticating the user (operation 304). For example, the baseline representations may be stored in an electronic device of the user to authenticate the user before access to the electronic device is granted. Alternatively, the baseline representations may be stored on a network-based repository for device-independent authentication of the user (e.g., before the user enters a building, accesses a user account, etc.). Authentication of users using facial gestures is described in further detail below with respect to FIG. 4.

Figure 4:
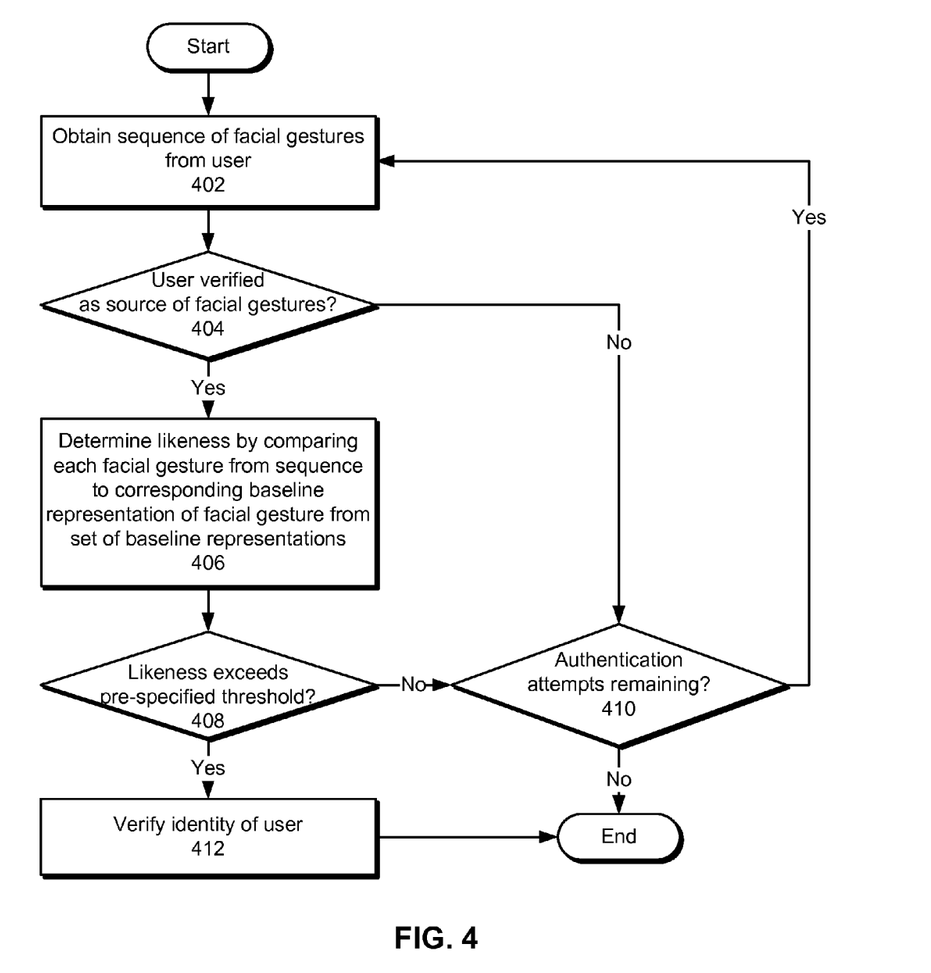
FIG. 4 shows a flowchart illustrating the process of authenticating a user in accordance with the disclosed embodiments.

FIG. 4 shows a flowchart illustrating the process of authenticating a user in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, a sequence of facial gestures is obtained from the user (operation 402). The user may be prompted to provide each facial gesture from the sequence, or the sequence may be obtained from the user without specifying the facial gestures in the sequence to the user. For example, the user may be shown a description of each facial gesture (e.g., "blank expression," "smile," "frown," "blink," "grimace," "crossed eyes," "nod," "headshake," etc.) in the sequence before the user provides the facial gestures. On the other hand, the user may be prompted for a "password" containing a sequence of facial expressions that is known only to the user.

Next, the user may be verified as a source of the facial gestures (operation 404). For example, the user may be verified as the source of the facial gestures if transitions between the facial gestures in the sequence are smooth. As a result, an authentication attempt that provides a series of still images of the user's facial gestures may be rejected because the transitions between the still images are jumpy and/or abrupt.

If the user is not verified as the source of the facial gestures, authentication of the user may be reattempted if authentication attempts remain (operation 410) for the user. For example, the user may be given three attempts to authenticate using facial gestures before the authentication of the user fails. Alternatively, the user may be automatically prevented from subsequent attempts to authenticate if an attempt to spoof the facial gestures by the user (e.g., by displaying still images of the facial gestures) is detected in operation 404.

If the user is verified as the source of the facial gestures, the user may be authenticated based on a likeness of the sequence to a set of baseline representations of the facial gestures. In particular, the likeness is determined by comparing each facial gesture from the sequence to a corresponding baseline representation of the facial gesture from the set of baseline representations (operation 406). The likeness may be calculated for each facial gesture or for the sequence of facial gestures as a whole (e.g., as an "average" value). The likeness may then be compared to a pre-specified threshold (operation 408) to determine the success or failure of the authentication.

If the likeness exceeds the pre-specified threshold, the identity of the user is verified (operation 412). For example, the user may be granted access to data, resources, and/or services associated with a user account tied to the user's identity after the user's identity is verified. If the likeness does not exceed the pre-specified threshold, the user may attempt to authenticate one or more times (operations 402-410) until the user's identity is verified or no more authentication attempts remain. If the user reaches the limit to the number of authentication attempts for authenticating the user, the user may be "locked out" of subsequent attempts to authenticate for a pre-specified period (e.g., minutes, hours, days, etc.) and/or until the user establishes his/her identity using a different authentication mechanism.

Figure 5:
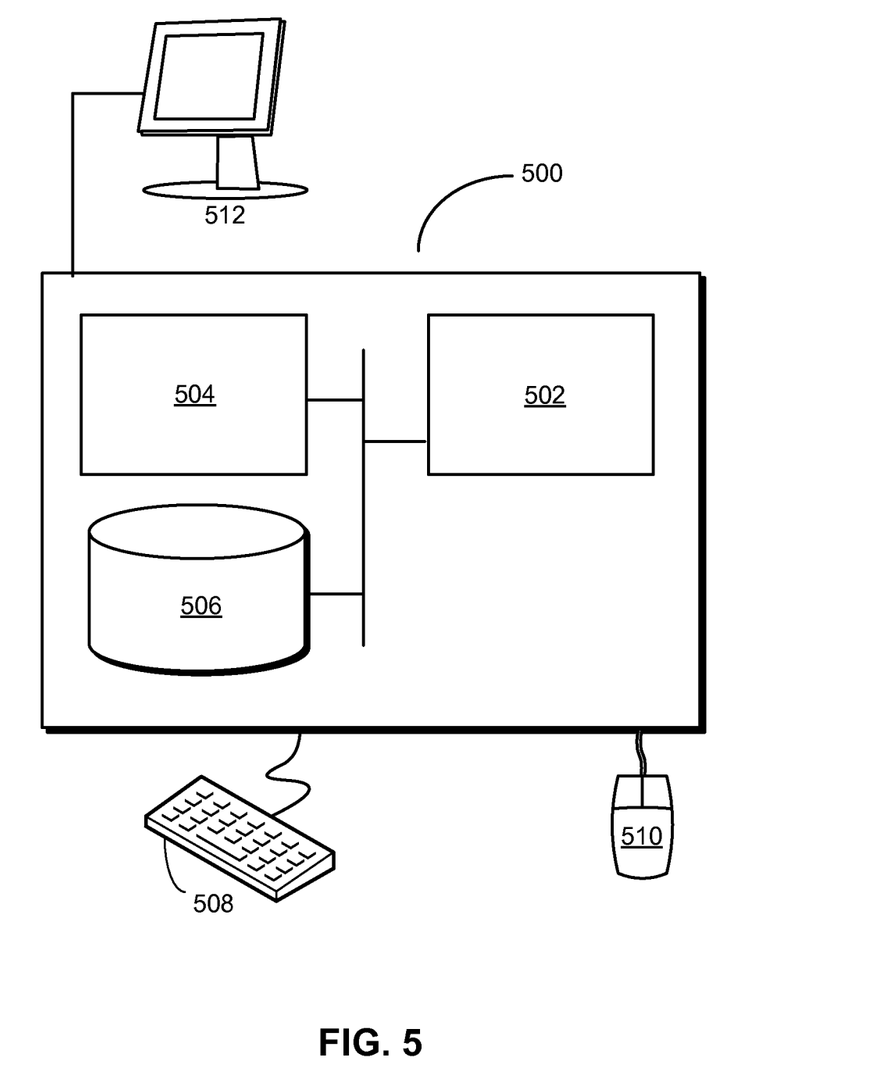
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for authenticating a user. The system may include a gesture-collection apparatus that obtains a sequence of facial gestures from the user. The system may also include an authentication apparatus that authenticates the user based on a likeness of the sequence to a set of baseline representations of the facial gestures. The authentication apparatus may also verify the user as the source of the facial gestures before authenticating the user by, for example, examining a smoothness of transitions between the facial gestures in the sequence.

In addition, one or more components of computer system 500 may be remotely located and connected to the other components over a network. Portions of the present embodiments (e.g., gesture-collection apparatus, authentication apparatus, etc.) may also be located on different nodes of a distributed system that implements the embodiments. For example, the present embodiments may be implemented using a cloud-computing system that authenticates a set of remote users using sequences of facial gestures from the users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for authenticating a user, comprising:
    obtaining a sequence of facial gestures from the user;
    verifying the user as a source of the facial gestures based on a smoothness of transitions between the facial gestures in the sequence; and
    authenticating the user based on a likeness of the sequence to a set of baseline representations of the facial gestures.

2. The computer-implemented method of claim 1, wherein the verifying occurs prior to the authenticating.

3. The computer-implemented method of claim 1, wherein obtaining the sequence of facial gestures from the user involves at least one of:
    prompting the user to provide each facial gesture from the sequence of facial gestures; and
    obtaining the sequence of facial gestures from the user without specifying the facial gestures in the sequence to the user.

4. The computer-implemented method of claim 1, wherein authenticating the user based on the likeness of the sequence to the set of baseline representations involves:
    determining the likeness by comparing each facial gesture from the sequence of facial gestures to a corresponding baseline representation of the facial gesture from the set of baseline representations; and
    if the likeness exceeds a pre-specified threshold, verifying an identity of the user.

5. The computer-implemented method of claim 4, wherein authenticating the user based on the likeness of the sequence to the set of baseline representations further involves:
    if the likeness falls below the pre-specified threshold, attempting to verify the identity of the user using one or more new sequences of facial gestures until a limit to the number of authentication attempts for authenticating the user using the facial gestures is reached.

6. The computer-implemented method of claim 4, wherein the identity is associated with a user account of the user.

7. The computer-implemented method of claim 1, wherein the sequence of facial gestures comprises at least one of:
    a blank expression;
    a smile;
    a frown;
    a wink;
    a blink;
    a grimace;
    a custom facial gesture; and
    a facial movement.

8. A computer-implemented method for facilitating authentication of a user, comprising:
    obtaining a set of baseline representations of facial gestures from the user; and
    storing the baseline representations for subsequent use in authenticating the user, wherein authenticating the user involves:
        obtaining a sequence of facial gestures from the user;
        verifying the user as a source of the facial gestures based on a smoothness of transitions between the facial gestures in the sequence; and
        authenticating the user based on a likeness of the sequence to the set of baseline representations.

9. The computer-implemented method of claim 8, wherein obtaining the set of baseline representations of the facial gestures from the user involves at least one of:
    prompting the user to provide each baseline representation from the set of baseline representations; and
    obtaining a selection of the baseline representation from the user prior to obtaining the baseline representation from the user.

10. The computer-implemented method of claim 8, wherein the baseline representations are stored on at least one of:
    an electronic device of the user; and
    a network-based repository.

11. A system for authenticating a user, comprising:
    a gesture-collection apparatus configured to obtain a sequence of facial gestures from the user; and
    an authentication apparatus configured to authenticate the user based on a likeness of the sequence to a set of baseline representations of the facial gestures, wherein the authentication apparatus is further configured to verify the user as a source of the facial gestures based on a smoothness of transitions between the facial gestures in the sequence.

12. The system of claim 11, wherein the verifying occurs prior to the authenticating.

13. The system of claim 11, wherein the gesture-collection apparatus is further configured to:
    obtain the set of baseline representations from the user prior to authenticating the user.

14. The system of claim 13, further comprising:
    a repository configured to store the baseline representations for subsequent use in authenticating the user.

15. The system of claim 14, wherein the repository is located on at least one of:
    an electronic device associated with the user; and
    a network connected to the electronic device.

16. The system of claim 13, wherein obtaining the set of baseline representations of the facial gestures from the user involves at least one of:
    prompting the user to provide each baseline representation from the set of baseline representations; and
    obtaining a selection of the baseline representation from the user prior to obtaining the baseline representation from the user.

17. The system of claim 11, wherein obtaining the sequence of facial gestures from the user involves at least one of:

prompting the user to provide each facial gesture from the sequence of facial gestures; and obtaining the sequence of facial gestures from the user without specifying the facial gestures in the sequence to the user.

18. The system of claim 11, wherein authenticating the user based on the likeness of the sequence to the set of baseline representations involves:

determining the likeness by comparing each facial gesture from the sequence of facial gestures to a corresponding baseline representation of the facial gesture from the set of baseline representations; and if the likeness exceeds a pre-specified threshold, verifying an identity of the user.

19. The system of claim 18, wherein authenticating the user based on the likeness of the sequence to the set of baseline representations further involves:

if the likeness falls below the pre-specified threshold, attempting to verify the identity of the user using one or more new sequences of facial gestures until a limit to the number of authentication attempts for authenticating the user using the facial gestures is reached.

20. The system of claim 11, wherein the sequence of facial gestures comprises at least one of:

a blank expression;
a smile;
a frown;
a wink;
a blink;
a grimace;
a custom facial gesture; and
a facial movement.

21. A non-transitory computer-readable storage medium storing instructions that when executed by a computer cause the computer to perform a method for authenticating a user, the method comprising:

obtaining a sequence of facial gestures from the user;

verifying the user as a source of the facial gestures based on a smoothness of transitions between the facial gestures in the sequence; and authenticating the user based on a likeness of the sequence to a set of baseline representations of the facial gestures.

22. The computer-readable storage medium of claim 21, wherein the verifying occurs prior to the authenticating.

23. The computer-readable storage medium of claim 21, wherein obtaining the sequence of facial gestures from the user involves at least one of:

prompting the user to provide each facial gesture from the sequence of facial gestures; and obtaining the sequence of facial gestures from the user without specifying the facial gestures in the sequence to the user.

24. The computer-readable storage medium of claim 21, wherein authenticating the user based on the likeness of the sequence to the set of baseline representations involves:

determining the likeness by comparing each facial gesture from the sequence of facial gestures to a corresponding baseline representation of the facial gesture from the set of baseline representations; and if the likeness exceeds a pre-specified threshold, verifying an identity of the user.

25. The computer-readable storage medium of claim 24, wherein authenticating the user based on the likeness of the sequence to the set of baseline representations further involves:

if the likeness falls below the pre-specified threshold, attempting to verify the identity of the user using one or more new sequences of facial gestures until a limit to the number of authentication attempts for authenticating the user using the facial gestures is reached.

26. The computer-readable storage medium of claim 21, wherein the sequence of facial gestures comprises at least one of:

a blank expression;
a smile;
a frown;
a wink;
a blink;
a grimace;
a custom facial gesture; and
a facial movement.

* * * * *